United States Patent [19]

Hanyuda

[11] Patent Number: 4,640,937
[45] Date of Patent: Feb. 3, 1987

[54] MODIFIED PHENOLIC RESIN COMPOSITION

[75] Inventor: Toshiaki Hanyuda, Yokohama, Japan

[73] Assignee: Showa Highpolymer Co. Ltd., Tokyo, Japan

[21] Appl. No.: 757,523

[22] Filed: Jul. 19, 1985

[51] Int. Cl.$^4$ ................................................. C08F 2/46
[52] U.S. Cl. ..................................... 522/31; 522/121; 522/122; 522/142; 522/169
[58] Field of Search ................. 522/31, 121, 122, 142, 522/169

[56] References Cited

FOREIGN PATENT DOCUMENTS 34-8138  2/1959  Japan .
57-33292 2/1982  Japan .

Primary Examiner—Joseph L. Schofer
Assistant Examiner—Bernard Lipman
Attorney, Agent, or Firm—Tilton, Fallon, Lungmus & Chestnut

[57] ABSTRACT

The present invention provides a resinous composition of modified phenolic compounds comprising a phenolic compound and an unsaturated cycloacetal, the composition being curable with an active energy rays, the improvement residing in the use of an onium salt. The cured material has no appreciable odor of acrolein and is stable in storage.

4 Claims, 3 Drawing Figures

MODIFIED PHENOLIC RESIN COMPOSITION

BACKGROUND OF THE INVENTION

The present invention relates to a curable resinous composition of modified phenolic compounds and more particularly it relates to a resinous composition of modified phenolic compounds curable by active energy rays and comprising phenolic compounds, a compound having at least two unsaturated cycloacetal groups in its molecule as a cross-linking agent, and an onuim salt as an photoinitiator.

DESCRIPTION OF THE PRIOR ART

Reactions between a phenolic compound such as phenol, cresol, xylenol and resorcinol and formaldehyde produce reactive type resole resins or non-reactive type novolac resins. These novolac resins represent so-called two stage cure phenolic resins which cure by the addition of a curing agent such as hexamethylene teramine. Although the phenolic resins are historically the oldest resins having a variety of superior properties, they require heating, pressurizing or degassing due to the release of reaction by-products upon curing such as water, formaldehyde, lower nitrogen-containing compounds, or ammonia on the basis of their polycondensation reactions. They also have drawbacks of occluding the reaction by-products into the cured products. For remedying these drawbacks, Japanese Patent Publications Nos. 34-8138, 34-8139 and 34-8141, disclose one of the few known counter-measures, wherein a phenolic compound and a diallylidenepentaerythrytol, which is known as a condensation product of acrolein and a polyhydric alcohol such as pentaerythrytol, are cured in the presence of a strong acid catalyst such as paratoluenesulfonic acid. These methods, however, still have such drawbacks that upon curing, decomposition of the diallylidenepentaerythrytol concommitantly takes place thereby releasing aldehyde, i.e., acrolein having a strong irritating odor and that the stability of the resinous composition after formulation thereof is lower. Therefore, these resinous compositions have yet not been practically utilized.

SUMMARY OF THE INVENTION

The main object of the present invention resides in the provision of a resinous composition comprising phenolic compounds and unsaturated cyctoacetal compounds such as diallylidenepentaerythrytol capable of curing without any irritating odor of acrolein, thereby eliminating the drawbacks of the prior art.

Thus the present invention is based on the discovery that a resinous composition comprising phenolic compounds unsaturated cycloacetal compounds such as diallylidenepentaerythritol system can be very rapidly photocured by the addition of an onium salt, which is a photocuring catalyst for curing a photo-curable composition comprising an unsaturated cycloacetal and polythiol (Japanese Patent Publication No. 57-33292), and which is selected from triarysulfonium, triarylselenium, and diarylhalonium with the result that there is very little irritating acrolein odor and no foaming takes place and that it has a superior shelf stability.

The present invention relates to a modified phenolic resinous composition curable with an active energy rays comprising at least one phenolic compound, at least one compound containing in one molecule at least two unsaturated cycloacetal radicals having the formula:

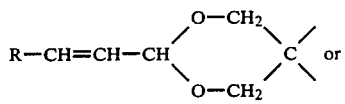

or

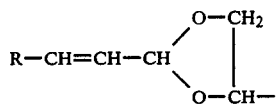

wherein R represents hydrogen or a methyl group, and an onium salt. More particularly, the present invention relates to an active energy radiation-curable modified phenolic resious composition comprising at least one phenolic compound selected from the group of a substituted or non-substituted mononuclear phenolic compound, dinuclear phenolic compound linked through a linking group, phenolic novolacs and polyvinyl phenolic compounds, at least one compound which contains substantially two or more unsaturated cyclo-acetal radicals in its molecule, as a cross-linking agent, the unsaturated cyclo-acetal radical being represented by the formula:

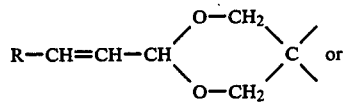

or

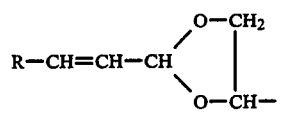

wherein R represents hydrogen or a methyl group, and an onium salt as a photoinitiator selected from the group consisting of an onium salt selected from diarylhalonium, triarylsufonium, or triarylselenium salt of tetrafluoroboron, hexafluoroarsenic, hexafluorophosphorus or hexafluoroantimony respectively.

DESCRIPTION OF THE PREFERRED EMBODIMENT

Figure 1:
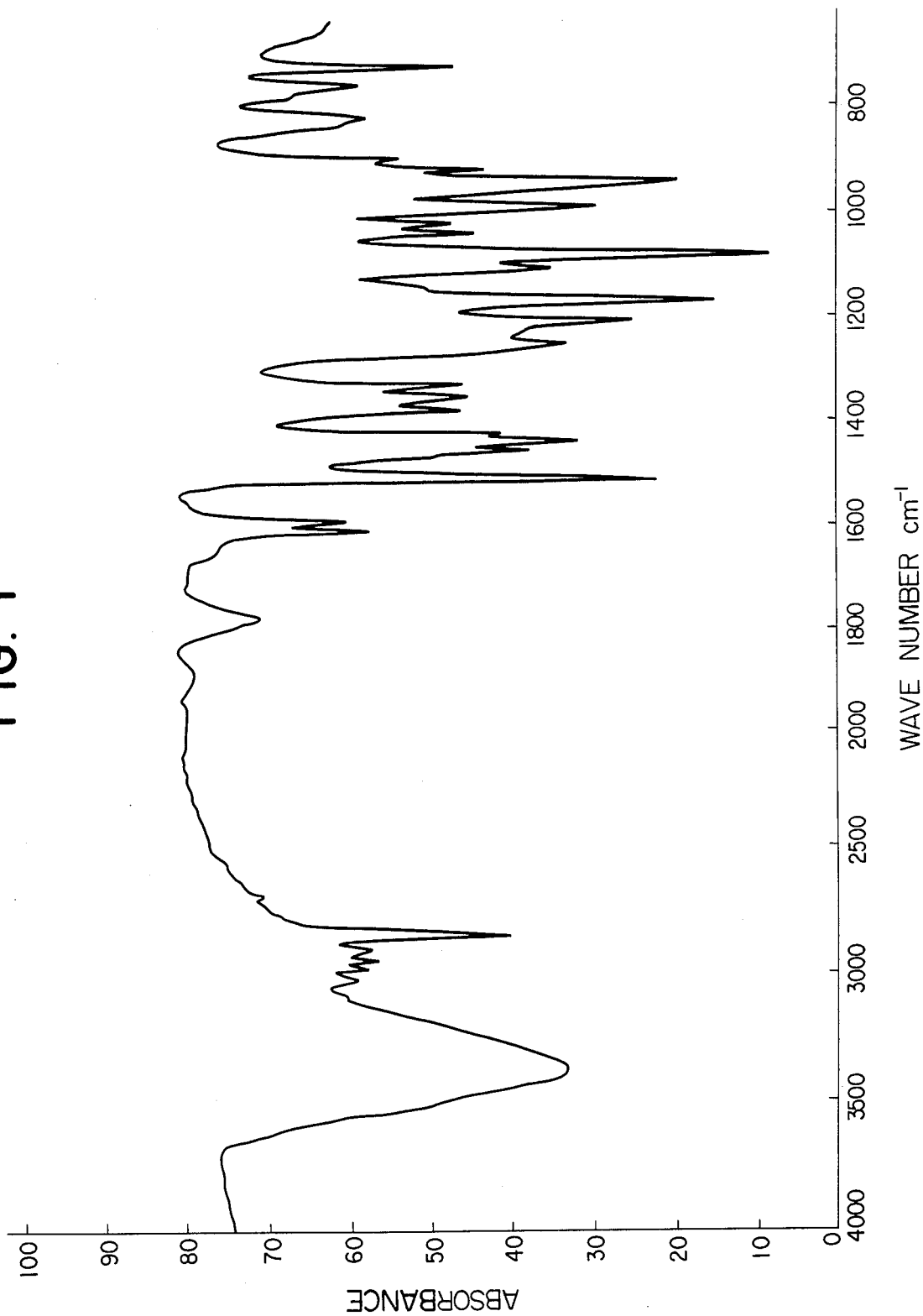
FIG. 1 is a chart of the infra-red spectrum of a mixture of diallydenepentaerythritol and phenolic novolac in a weight ratio of 50/50 to which was added 1.5% by weight of an photoinitiator, UVE-1014, sold by Gernal Electric Company, USA.

The phenolic compounds employable herein include monohydric or polyhydric mononuclear phenolic compounds such as phenols, cresols, xylenols, resorcinols, and the like; dinuclear phenols resulting from linking phenolic compounds typified by phenols or cresols with a linking group, such as bisphenols derived from the condensation of the phenolic compounds with formaldehyde, its equivalent paraformaldehyde, or a ketone such as acetone in the presence of an acid catalyst; and novolac resins still having active hydrogen atoms in their phenolic nuclears. The novolac resins also include those having alkylphenols such as p-t-butylphenol, or phenylphenol as a portion of the novol composition. Polyvinyl phenol known as a polymer derived from p-vinyl phenol can also be employed similarly. Any mixture of these phenols can naturally be employed herein.

The compounds having two or more unsaturated cycloacetal radicals employable herein are those disclosed in Japanese Patent Publication No. 57-33292 and typically prepared by the condensation of a polyol and an unsaturated aldehyde in the presence of an acid catalyst. Thus, the compounds can be obtained by condensing at an elevated temperature pentaerythritol and a molar excess of an unsaturated aldehyde such as acrolein or crotonaldehyde in the presence of a strong acid such as paratoluenesulfonic acid. After the condensation, the reaction mixture is neutralized, and then the excess aldehyde is driven off. Thereafter the condensation product is obtained by either of crystallization, distillation or extraction. The typical method for the production is described by Schulz et al. in the Angew. Chem. 62 105 (1950) and is incorporated herein by referring same. Among these unsaturated cycloacetal compounds, pentaerythritoldiacroleinacetal (diallylidenepentaerythritol), pentaerythritoldicrotonaldehydeacetal (3.9-dipropenyl-2, 4, 8, 10-tetraoxaspihiro-5.5-undecane), cyclohexanontetramethyloldiacroleinacetal, cyclohexanonetetramethyloldicrotonacetal, and sorbitoltriacroleinacetal are typical ones.

The relative proportions of phenolic compounds and the unsaturated cycloacetal radical-containing compounds may be determined stoichiometrically in some degree. For example, if phenol, as a component for the phenolic compounds and diallylidene pentaerythritol, one of the most representative unsaturated cycloacetal compounds are used, 1.0 mol of phenol and about 1.5 mol of the latter are used. If bisphenol A is used, then 1 mol of bisphenol A is mixed with about 1 mol of diallylidenepentaerythritol to form the curable resinous composition. When polyvinylphenol or novolac is used, the relative proportion can be varied over a wide range depending upon the molecular weight of the polyvinylphenol or novolac or the object to be achieved. However, if common commercially available novolac is used, about 15 parts by weight of diallylidenepentaerythritol per 100 parts by weight of novolac can contribute to the gelling of the composition, while, 80–130 parts, preferably 100–130 parts by weight of diallylidenepentaerythritol per 100 parts by weight of novolac give a very hard, tough cured resin. For achieving the object of retaining flame-retardant property inherent to phenolnovolac, the proportion of diallylidenepentaerythritol is less, and for achieving toughness the latter may be used in relatively large amounts. In this way, the relative proportion can be determined in accordance with the stoichiometric handling of the average molecular weight of polyvinyl phenol and novolac. The scope of the present invention includes other compound or compounds in an amount not damaging the concept of the present invention. Thus, it is within the scope of the present invention to modify the composition by further adding polythiol employed in the above-mentioned Japanese Patent Publication in an amount smaller than the stoichiometric amount for the unsaturated cycloacetal thereby providing flexibility. It is also contemplated to add an epoxy resin for the dilution of the system or modification and further the incorporation of polymer compounds such as polyvinylbutyral or neoprene rubber is included within the scope of the present invention. It is also contemplated to incorporate a light-transmitting filler and/or fiber such as glass fibers.

The photoinitiator, herein referred to is onium salts which have been described by Crivello et al. in the J. Poly. Sci. Sym. No. 56, pages 1–11. In the above literature, however, only the polymerization of cationically polymerizing compounds, for example, a polymerization of monomers such as α-methylstyrene, a vinylether and the like and a ring-opening polemerization of a ring compound such as trioxane, epoxides, acetals, lactones, and the like in the presence of the onium salt are reported, and no reference is made to the polymerization of unsaturated cycloacetals and phenols. Thus, this onium salt catalyst has been heretofore only noted as an good catalyst for a curing epoxy resin, especially for an cycloaliphatic epoxy compound. It is quite surprising to find that the curing of the mixture of phenols and unsaturated cycloacetals can proceed without releasing an irritating acrolein odor if the onium is used as the curing catalyst.

The photoinitiator, i.e., photoinitiating cationic catalyst, is onium salts of diarylhalonium such as diaryliodinium, triarylsulfonium, triarylselenium of fluorinated boron, fluorinated arsenic, fluorinated phosphorus, fluorinated antimony, and the like. These onium salts are potential Lewis acid sources which generate Lewis acid upon absorption of active energy such as ultraviolet light. These include onium salts comprising dibenzeneiodinium, ditoluene iodinium, di-t-butylbenzeneiodinium, tribenzenesulfonium, tritoluenesulfonium, trimethoxybenzenesulfonium, tribenzeneselenium and the like of tetrafluoroboron, hexafluoroarsenic, hexafluorophosphorus, hexafluoroantimony, and the like. As these onium salts for photoinitiating an epoxy resin, triaryl sulfonium salt has recently become readily commercially available under the trade name of "UVE 1014" (General Electric Co.). Particular reference is made to these onium salts in a test entitled "UV Curing: Science and Technology", edited by S. Peter Pappas, and relevant descriptions from the text which are incorporated by refering it herein. The amount of these catalysts to be used is 0.1–5% by weight, more preferably 0.25–3% by weight of onium salt per 100 parts by weight of phenols plus the unsaturated cycloacetal.

The resinous composition of the present invention can be gelled or cured by irradiating active energy rays such as those obtainable from a UV generation apparatus such as a medium to high pressure mercury lamps. However, it is preferable, contray to the conventional polymerization of epoxides alone or a polymerization of vinylether, to perform a post thermal curing for a short period of time, without relying on the radiant heat from the UV lamp, in combination with the photo-irradiation in which the onium salts effectively generate a source of Lewis acid as a catalyst for the addition reaction between phenolic compounds and the unsaturated cycloacetal compounds under photoirradiation. It may be possible to add a photochemical sensitizer such as acridine orange as set forth in J. POLY. SCI. CHEM. 16, 2441 (1979). The composition of the cured material of the curable modified phenolic resinous composition according to the present invention is not yet precisely understood, but it is thought that a cross-linking reaction based on the reaction between the active hydrogens on the benzene ring of phenolic compounds and the unsaturated groups of the unasaturated cycloacetal compounds takes place because according to the above-mentioned Japanese Patent Publication No. 34-8138, or a bisphenol is synthesized containing spiro (m-dioxane) from a largle excess of phenol and diallylidenepentaerythritol.

However, upon photo-curing of the composition according to the present invention it may be expected that ring opening of the diallylidenepentaerythritol, a six-membered ring, may partly happen, because as we already published that a ring opening of diallylidenepentaerythritol or unsaturated cyclooxoranacetal is observed in the presence of a free radical-generating catalyst or under the irradiation of radiation (see the journal "Shikizai" 53[3]140–145(1980), & Japan Adhesive Association Kanto Branch 1978, December Regular Meeting as to the former and "MACROCHEMIE"95(1966) 168–178, Furukawa, et al. about the latter). Thus, the reactions between the phenols and the unsaturated cycleacetals is modeled as follows, taking phenol novolac as the phenols and the unsaturated cycleacetals is modeled as follows, taking phenol novolac as the phenols and diallylidenepentaerythritol as the unsaturated cyclo-acetals:

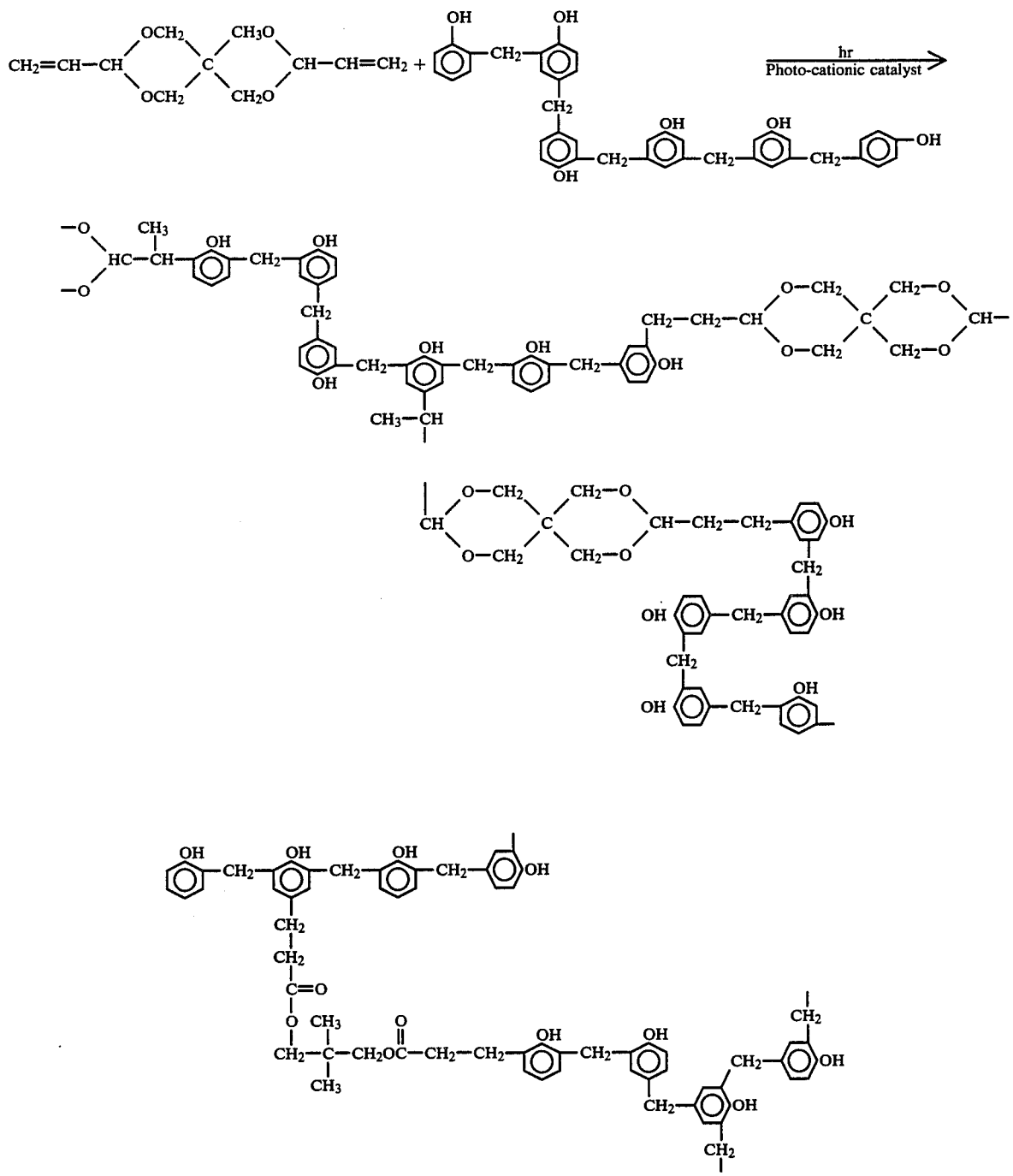

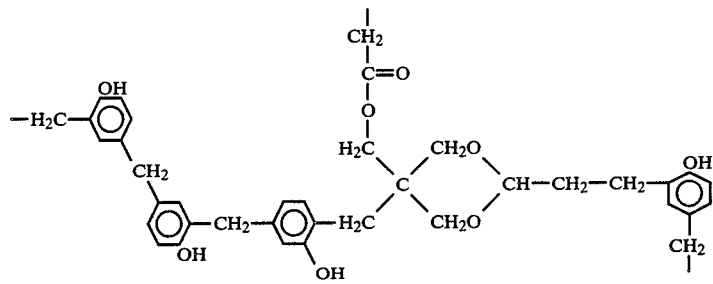

Figure 2:
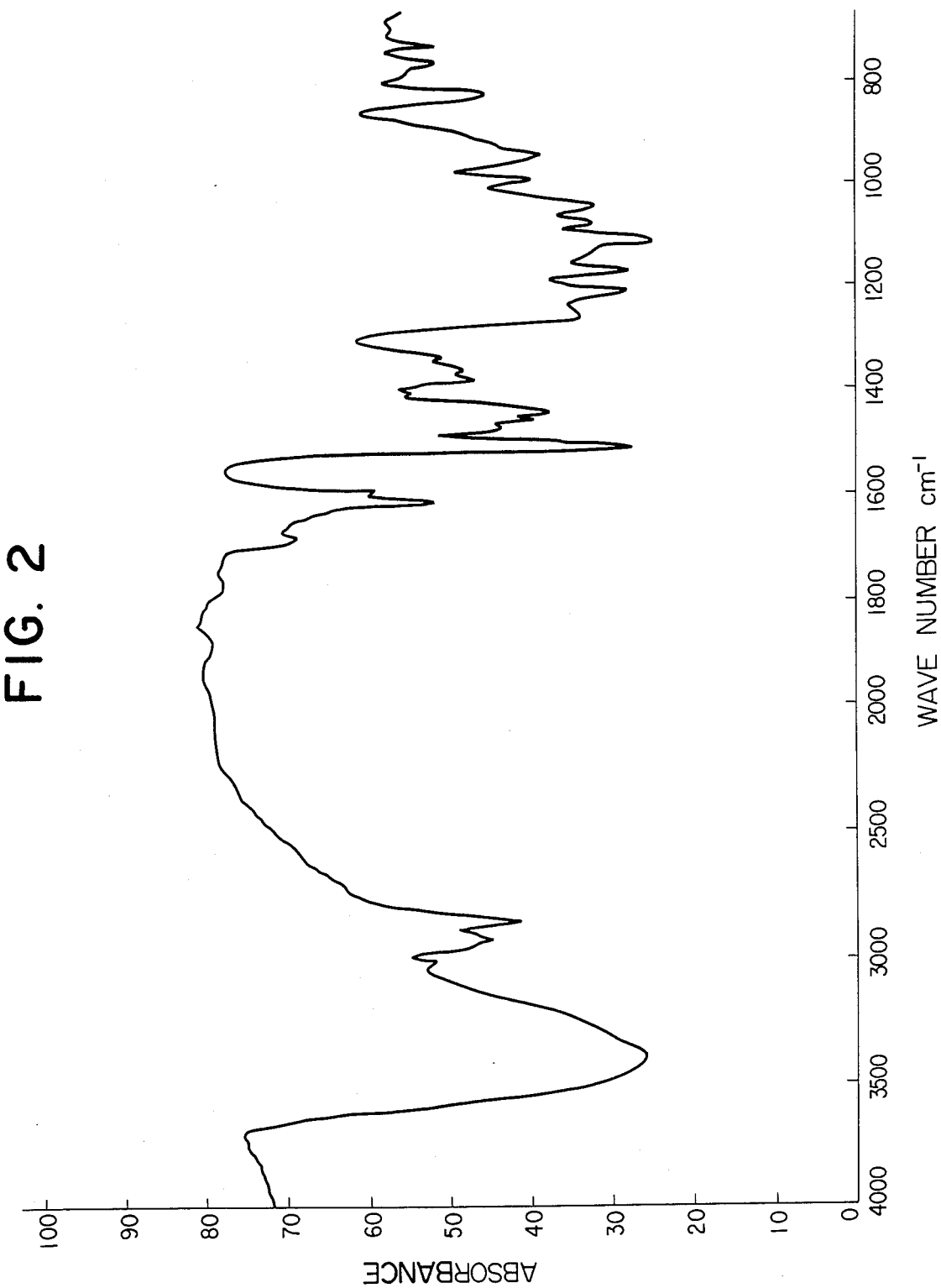
FIG. 2 is a chart of the infra-red spectrum of the photo-cured product of FIG. 1.
Figure 3:
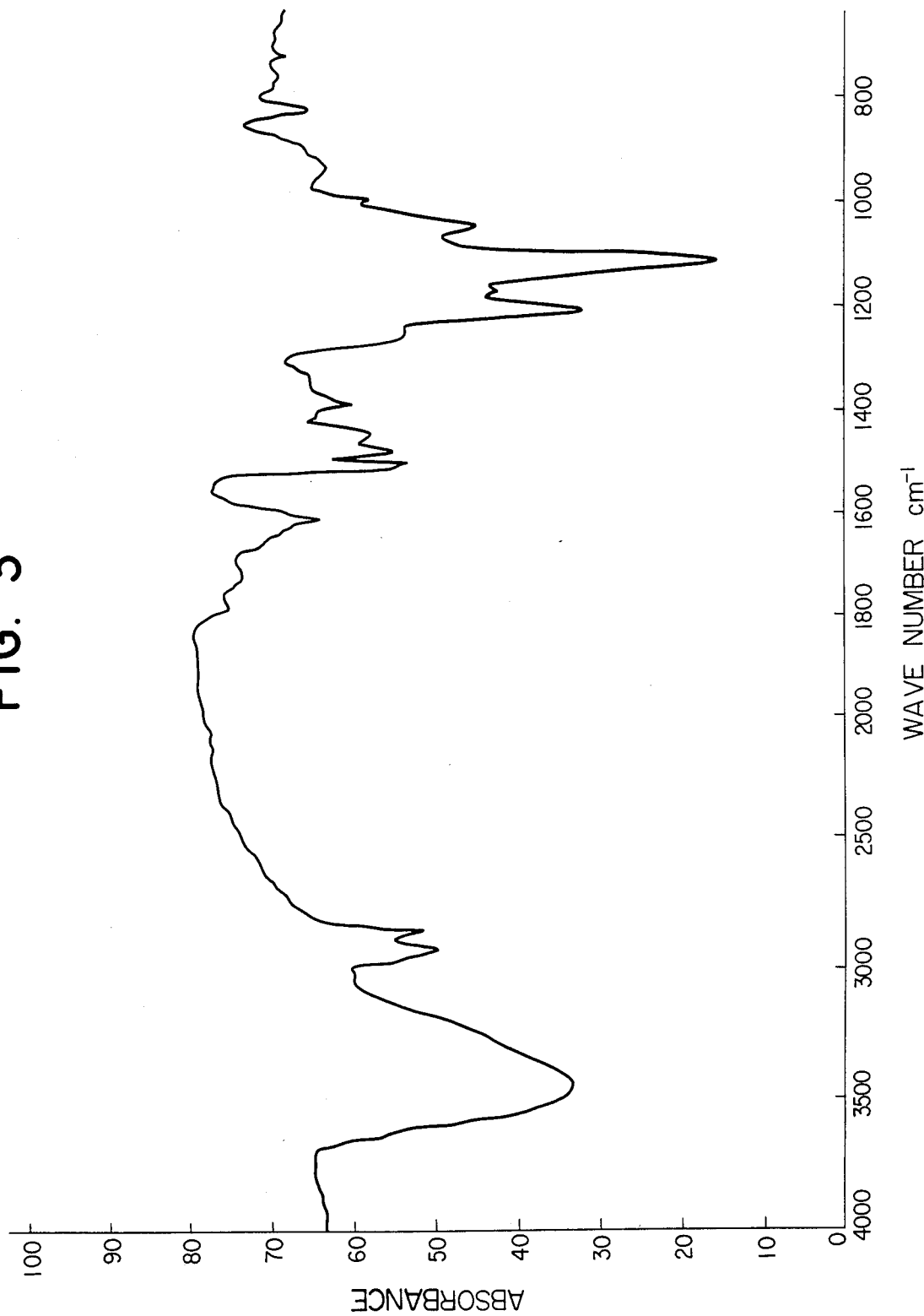
FIG. 3 is a chart of infra-red spectrum after thermally post-cured product of the photocured product of FIG. 2.

FIG. 1 is a chart of infra-red spectrum analysis of a composition comprising phenol novolac and diallylidenepentaerythritol in a weight ratio of 50/50 to which is added 1.5% by weight of an photoinitiator, UVE-1014. FIG. 2 is a chart of infra-red spectrum analysis after photo-curing and FIG. 3 is a chart of infra-red spectrum analysis after subsequent post heat-curing, in which the peak of 1720 cm$^{-1}$ represents the obsorption of carbonyl in ester, and the peaks at 1470 cm$^{-1}$ and 880M$^{-1}$ are absorption due to tetra-substituted benzene nucleaus.

Upon ignition of the cured resin, generally a sever irritation occurs if the unreacted diallylidenepentaerythritol remains. However, the cured resin of the present invention does not give an appreciable irritation due to acrolein, and thus it is thought that hydrallylidenepentaerythritol almost entirely participates in resin formation.

The resinous compositions according to the present invention are useful for the preparation of coatings, adhesive materials, inks, and reinformed laminates.

The invention will be illustrated by way of the following examples.

EXAMPLE 1

A mixture was prepared by mixing 3.1 g of phenol as a source of phenolic compounds, 10.6 g of diallylidenepentaerythritol as a source of unsaturated cycloacetal compounds, and 0.4 g of UVE-1014 (a 50% solution of triarylsulfonium salt in propylenecarbonate, General Electric Co.) and the resulting mixture was poured to a depth of about 200μ thick into a shallow dish over which an ozone-type high pressure mercury lamp carried on a moving belt was passed at a distance of 15 cm for 0.75 second per one pass. After about 20 passes, i.e., 14–15 seconds of irradiation, the spread mixture was cured to form a very hard, brownish film which was not degraded in acetone.

EXAMPLE 2

A mixture was prepared by mixing 5.7 g of bisphenol A as a source of phenolic compounds and 24 g of pentaerythritoldicrotonaldehydeacetal as a source of unsaturated cycloacetal compounds. The resultant mixture was heated at 75°–80° C. to form a solution to which was added 0.52 g of UVE-1014, after which it was spread and cured to form a film about 200μ thick as in Example 1.

The solution was cured with about 30 passes, i.e., 20 seconds of irradiation to form a brownish cured film having a strong aceton-resistance.

EXAMPLE 3

To 100 g of phenol novolac as a source of phenolic compounds was added and mixed diallylidenepentaerythritol in amounts of 0, 10, 20, 30, 40, 60, 80, 100 and 120 g in 100 g of acetone per 100 g of novolac and 5 wt % of UVE-1014 as a photoinitator.

The resultant 9 samples were labelled as Samples No. 0–No.8. A portion of each sample was put into a shallow disk 1 mm thick, air dried and then heated it at 120° C. to thoroughly drive off acetone followed by standing at 100°–150° C. for 30 minutes. The samples thus treated gave rise to only coloring due to the pyrolysis of diallylidenepentaerythritol without gelation. This demonstrates that the opium salt incorporated as the photoinitating catalyst is very stable against both phenols and unsaturated cycloacetal compounds, and thus reveals the long shelf stability at a temperature below the thermally stable temperature of the unsaturated cycloacetals such as diallylidenepentaerythritol.

The samples of the resin mixtures No.0–No.8 were put into a shallow dish 1 mm thick, air dried followed by driving off acetone at 120° C. and then were irradiated with a high pressure mercury lamp as in Example 1. Sample No. 0 which had no onium salt added showed no change after 60 irradiation and only some stickiness after heating with radiant heat. Contrary to sample No. 0, Samples No. 1–No. 8 changed to a pink color over their entire mass after 1 or 2 irradiations (1–2 seconds) followed by a change to a brown color upon continuing irradiation. After 4 to 10 irradiations (showing a brown color) they became tack free and then they were heated at 120° C. for 10 minutes in order to cure them. The cured resins were light amber in color. The same procedures were carried out on the sample having no onium salt with the results that the sample remains in the form of sticky viscous liquid showing substantially no change. Samples No. 1–No. 8 were further heated to 150°–190° C. and indicated higher hot hardness with increasing amounts of diallylidenepentaerythritol.

Thus, the cured products were very tough where diallylidenopentaerythritol was at least 60 g per 100 g of novolac. A gelling examination was effected on curing, the samples containing 20 g or more of diallylidenepentaerythritol were effective and those containing 60 g or more of diallylidenepentaerythritol were perfect for gelling. From the standpoint of stoichiometry, as the novolac represents a six-nuclear novolac which requires about 50 parts of diallylidenepentaerythritol for 100 g of the novolac, for nine-nuclear novolac about 30 parts and for 15-nuclear novolac about 15 parts of diallylidenepentaerythritol, respectively, for 100 parts of said novolac. Thus the test results set forth above were reasonable. The cured film resulting from mixtures containing 80–120 parts of diallylidenepentaerythritol per 100 parts of novolac indicated 4H–6H pencil hardness.

EXAMPLE 4

Example 3 was repeated except that as the source of phenolic compounds, a novolac having a larger molecular weight than that in Example 3 and having a softening point of 85° C. was used instead of the novolac in Example 3. The amount of diallylidenepentaerythritol used was 10, 20, 30 and 50 parts per 100 parts of the novolac, and the amount of catalyst, UVE-1014 was 1% and 3%, respectively. Even the samples having a smaller content of catalyst had no significant difference in physical properties from that with a higher content after post-curing by heating 120° C. for 5 minutes, the difference being a only 2–3 seconds longer period of time required from the pink coloring to brownish coloring upon the ultra-violet light irradiation. The samples containing 30 parts or more of diallylidenpentaerythritol formed a tough and firm film and showed no fuming upon combution like the conventional phenolic resins and showed self-extinguishing characteristics. The sample containing 50 parts diallylidenepentaerythritol gave rise to a very small amount of soot of fuming upon combution. This sample provides a high quality transparent laminate by impregating the resin into glass-fibers followed by usual laminating steps.

EXAMPLE 5

Example 3 was repeated except that 50 g of polyvinyl phenolic resin (Maruzen Sekiyu) which is a polymer derived from para-substituted phenol was used as a source of phenol, 40 g of diallylidenepentaerythritol, 40 g of pentaerythritoldicrotoncetal and 3% by weight of UVE 1014 as the catalyst. After 10 seconds irradiation with UV light, the samples were subjected to heat-curing by heating at 150° C. for 10 minutes followed by heating at 210° C. for 20 minutes to form a very hard film having a pencil hardness of 6H–8H.

EXAMPLE 6

A mixture of 50 g of phenolnovolac and 50 g of diallylidenepentaerythritol was diluted with 20 weight of cycloaliphatic epoxy resin (Ciba-Geigy, CY179) to which was added 3% by weight of UVE1014 as a photoinitiator. The resulting resinous mixture was used to form a 1 mm-thick coating on a steel plate after incorporating 20% by weight of glass flakes #150 (Nippon Glass Co.) as a light transmitting filler into the mixture. The coated film was subjected to two irradiations with a high pressure mercury lamp, thereby gelling the film.

The resultant gelled film was further subjected to a post-thermal curing at 150° C. for 10 minutes. Thus, there was obtained a very hard heat-resistant cured film.

As is apparent from the foregoing, the present invention can provide a cured very hard resin without generating an irritating acrolein odor upon an reacting phenolic compound and an unsaturated cycloacetals by the use of a cationic onium salt as the photoinitiator.

What we claim is:

1. A modified phenolic resinous composition curable with active energy rays comprising at least one phenolic compound selected from the group consisting of substituted or unsubstituted mononuclear phenol, bisnuclear phenol linked through a linking group, phenolic novolacs, and polyvinylphenols, at least one compound containing in one molecule at least two unsaturated cycloacetal radicals having the formula:

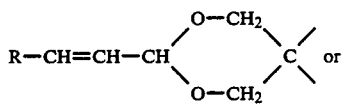

or

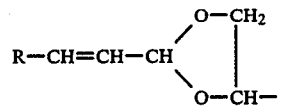

wherein R represents hydrogen or a methyl group, and an onium salt selected from the group consisting of salts of diarylhalonium, triarylsulfonium and triarylselenium with tetraflourinated boron, hexafluorinated arsenic, hexafluorinated phosphorus, and hexafluorinated antimony.

2. The composition according to claim 1 wherein said unsaturated cycloacetal radical-containing compound is selected from pentaerythritoldiacroleinacetal, pentaerythritoldicrotonaldehydeacetal, cyclohexanonetetramethyldiacroleineacetal, cyclohexanonetetramethyloldicrotoneacetal, and sorbitoltriacroleinacetal.

3. The composition according to claim 1 wherein the relative molar proportion of the unsaturated cycloacetal radical-containing compound to the mononuclear phenol is about 1.5 to 1.

4. The composition according to claim 1 wherein the relative weight proportion of the novolac to the unsaturated cycloacetalradical containing compound is about 80–130 part by weight of said compound to 100 parts by weight of said novolac.

* * * * *